United States Patent [19]

Johari

[11] 4,301,497

[45] Nov. 17, 1981

[54] FLYBACK CONVERTER CONTROL WITH FEED FORWARD

[75] Inventor: Girish C. Johari, Round Rock, Tex.

[73] Assignee: International Business Machines Corporation, Armonk, N.Y.

[21] Appl. No.: 159,560

[22] Filed: Jun. 16, 1980

[51] Int. Cl.³ .............................................. H02M 3/335
[52] U.S. Cl. ....................................... 363/21; 363/37; 363/80; 363/97
[58] Field of Search ....................... 363/15, 16, 20, 21, 363/37, 79, 80, 97

[56] References Cited

U.S. PATENT DOCUMENTS

| 3,818,306 | 6/1974 | Marini | 363/15 |
| 3,863,140 | 1/1975 | Easter et al. | |
| 3,909,696 | 9/1975 | Katov et al. | 363/21 |
| 4,079,294 | 3/1978 | Teuling | |

OTHER PUBLICATIONS

IBM Technical Disclosure Bulletin, vol. 22, No. 6, pp. 2191-2192, "Circuit to Linearize the Control Loop of a Switching Voltage Regulator", R. E. Calvo, G. C. Johari.

Primary Examiner—William M. Shoop
Attorney, Agent, or Firm—Douglas H. Lefeve

[57] ABSTRACT

A constant loop gain is achieved in a flyback type DC to DC converter by use of feedback to correct for load variations and feed forward to correct for line voltage variations. The feedback signal and a reference voltage are compared by an error amplifier. An output of the error amplifier is multiplied by a constant and is added to a signal proportional to line voltage. The resulting sum causes modification of the slope of a ramp voltage which is compared to the voltage at the output of the error amplifier to control the "on" times of the converter switching devices.

15 Claims, 4 Drawing Figures

FLYBACK CONVERTER CONTROL WITH FEED FORWARD

DESCRIPTION

1. Technical Field

This invention relates to regulated power supplies and more particularly to switching regulators of the flyback converter type with compensation for load variations and input signal variations.

2. Background Art

Present power supply technology advancements have resulted in an increasing use of switching regulator power supplies in data processing system applications. This is contrasted with an earlier heavy usage of power supplies employing linear regulation. The trend has shifted toward switching regulator supplies because of their lower cost, lower packaged volume, and greater efficiencies for a given regulation criteria.

In switching regulator supplies two well known types of DC to DC converters are the forward converter and the flyback converter. With the forward converter an inductor is typically utilized as a part of the output filtering circuit. This inductor is eliminated in the flyback converter circuit which, therefore, provides a cost, volume, and weight savings when the inductor is eliminated by choice of the flyback converter topology.

With both of these converters the output DC voltage is related to the duration of time that one or more switching devices in series with the power transformer primary remains on. It is well known in the prior art to employ pulse width modulation responsive to an error signal derived from the output voltage to provide a closed regulation loop for maintaining a constant output voltage despite significant load variations.

An improvement to the technique of varying the "on" times of the power transformer primary switching devices involves sensing the input voltage for input signal variations (as well as the output voltage for output voltage variations due to load changes) and effecting control of the switching device "on" times in accordance with input signal variations as well as load variations. An example of this type of circuit is shown in FIG. 3, herein, for analysis below.

The prior art circuits using feed forward and feedback have used forward converter topology, as described below. When these techniques are applied to forward converter switching regulators a constant loop gain relative to input line voltage is achieved as shown by curve 30 in FIG. 2 herein. However, when it was attempted to employ a similar combination feed forward and feedback control technique to a switching regulator power supply having a flyback converter topology, a very non-linear relationship was found to exist between the loop gain and the line voltage, as shown by curve 32 in FIG. 2 herein.

It would, therefore, be very desirable to utilize a combination feedback and feed forward control technique in a flyback converter switching regulator power supply in a manner which achieves the constant loop gain versus line voltage which has been realized relative to the forward converter topology.

SUMMARY OF THE INVENTION

Accordingly, a constant loop gain in a DC to DC converter using flyback topology is achieved by use of feedback to correct for load variations and feed forward to correct for line voltage variations in a circuit having a significant modification beyond the prior art. The feedback signal and a reference voltage are compared by an error amplifier. An output of the error amplifier is multiplied by a constant and is added to a signal proportional to line voltage. The resulting sum causes modification of the slope of a ramp voltage which is compared to the voltage at the output of the error amplifier to control the "on" times of the converter switching devices.

The summation of the voltage derived from the error amplifier output with the voltage proportional to the line voltage adapts the known combination feedback/feed forward control technique to the flyback converter topology to provide a constant loop gain with respect to line voltage variations.

The foregoing and other objects, features, extensions, and advantages of the invention will be apparent from the following more particular description of the preferred embodiments of the invention, as illustrated in the accompanying drawing.

DETAILED DESCRIPTION OF THE PREFERRED EMBODIMENTS

Figure 3:
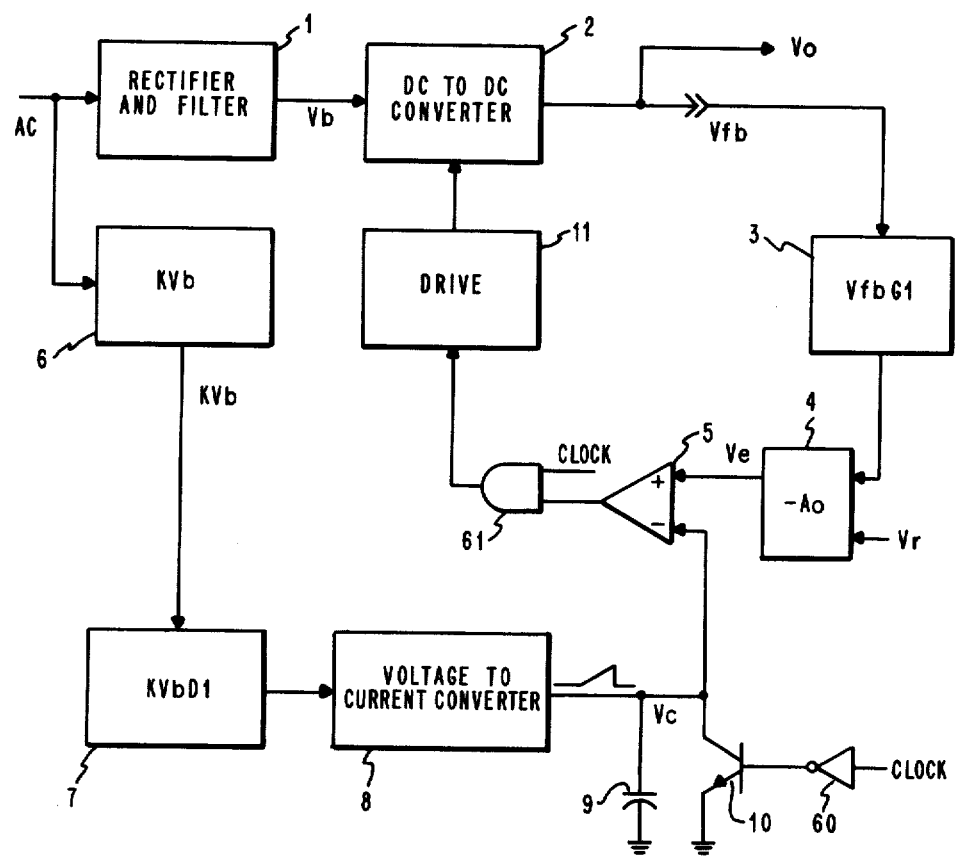
FIG. 3 is a block diagram of a prior art switching regulator circuit which employs both feed forward and feedback.

Referring now to FIG. 3, a block diagram of a prior art switching regulator circuit which employs both feed forward and feedback is shown. An AC signal is applied to a rectifier and filter circuit 1 to generate a bulk DC voltage Vb. The rectification circuit may provide either full wave of half wave rectification and may also provide a multiplication function. Surge limiting resistors may typically be included on the AC side of the rectifier circuit. The filter portion of the circuit may comprise a capacitor which, in conjunction with the surge limiting resistors, provides an RC filter.

The bulk rectified and filtered DC voltage Vb is applied to a DC to DC converter circuit 2. The Vb voltage input to the DC to DC converter is typically applied to one end of a primary winding of a power transformer. The other end of the primary winding of the power transformer is periodically switched to ground by a transistor switch to provide a chopping action which produces a pulsating voltage on a secondary winding of the power transformer. This pulsating voltage on the secondary winding of the transformer is filtered and applied to a load as the DC output voltage of the supply, Vo.

The power transformer and associated rectification and filtering circuitry used with the circuitry shown in FIG. 3 have been shown in the prior art in the form of a forward converter topology. In the forward converter topology DC pulses on the secondary of the power transformer are applied to an LC filter. The secondary winding DC pulses are in phase with the energization of the transformer primary winding.

With the regulation technique shown a feedback voltage Vfb is applied from the output of the power supply through a fractional constant multiplication circuit 3 to the positive input of an inverting amplifier 4. The fractional voltage multiplication circuit 3 may be a voltage divider network to multiply the feedback voltage Vfb by the constant G1. To the minus input of the inverting error amplifier 4 is applied a positive reference voltage Vr. The output of amplifier 4 is an error voltage Ve which is applied to the positive input of a comparator 5.

Another DC voltage, KVb is derived from the AC input signal and, being directly proportional to Vb, is also directly proportional to the magnitude of the AC signal. The circuit 6 to generate the KVb voltage which is used in the regulation technique may be, for the purposes of safety, electrically isolated from the AC signal by use of a small transformer and separate rectification and filtering circuitry. The KVb voltage is multiplied by another constant D1, by circuit 7 which may be a voltage divider circuit. The resultant voltage KVbD1 which is directly proportional to the AC signal input to the supply, is applied to a voltage-to-current converter 8 which supplies a varying current to capacitor 9 in direct proportion to the KVbD1 voltage. Thus the voltage, Vc, developed across capacitor 9 is produced by application of the current KVbD1K1 amps to the capacitor 9.

Capacitor 9 is allowed to charge by periodically opening the transistor switch 10 when the output of inverter 60, to which is applied a rectangular wave CLOCK pulse train, goes to its low state. The Vc voltage rises from a low level in the form of a ramp waveform. The slope of this ramp wave form is variable in accordance with the voltage applied from circuit 7 to the voltage-to-current converter 8. The voltage at circuit 7 is in direct proportion to the AC input signal; therefore, the slope of the ramp voltage Vc becomes steeper with a higher magnitude AC input signal and flatter with a lower magnitude AC input signal.

The comparator 5 compares the instantaneous magnitude of the ramp voltage Vc with the amplified error voltage Ve. During the high level of the CLOCK pulse train the ramp portion of the Vc waveform is generated. During the ramp portion of the Vc waveform, when Ve exceeds Vc a positive output signal is produced by comparator 5. The high level of the CLOCK pulse train enables the AND gate 61 to gate the positive output signal of comparator 5 to the converter switching transistor drive circuitry 11 during this time. Thus, when both the comparator 5 output and the CLOCK pulse train are at an up level the drive circuitry 11 turns on the switching transistor in the DC to DC converter 2 to provide energization to the primary of the power transformer in coverter 2.

A greater error voltage Ve allows the on time to become longer because more time elapses as the ramp portion of Vc rises to a level comparable to the Ve voltage. For a given Ve voltage, the on times of comparator 5 and drive circuitry 11 are increased when the ramp portion of the Vc voltage assumes a flatter than nominal angle by virtue of a decreased magnitude of AC input voltage to the supply. In this manner, it is seen how the feedback loop including voltage Ve and the feed forward loop including the Vc voltage, together, provide regulation to the output voltage Vo despite variations due to both load changes and AC input signal changes.

Assuming a forward converter topology is used in the DC to DC converter 2 of the prior art circuit of FIG. 3 the output voltage Vo is given as:

$$Vo = \frac{Vb}{n} \cdot \frac{Ton}{T} \tag{1}$$

where:

n = power transformer turns ratio;

Ton = on time of converter switch; and

T = total period of transistor switch cycle = Ton + Toff.

The loop gain A1 of the power supply employing forward converter topology is given as:

$$A1 = \frac{dVo}{dVfb} = \frac{C\, Ao\, G1}{D1\, K\, K1\, n\, T} \tag{2}$$

where:

Ao = gain of inverting error amplifier 4; and

C = capacitance of capacitor 9.

Figure 2:
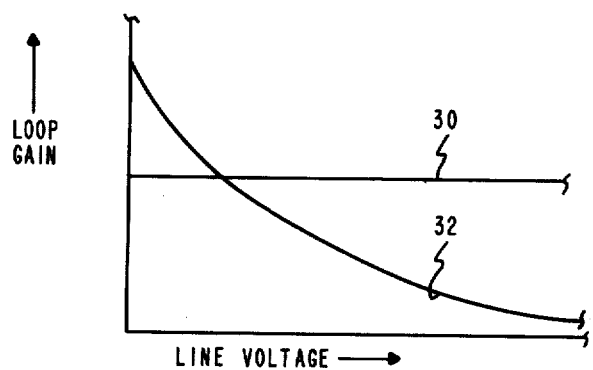
FIG. 2 shows curves of loop gain versus line voltage which are achieved by the switching regulator power supply of this invention compared with those achieved by prior art circuitry.

It will be noted that each of the terms in the equation (2) for the loop gain of the forward converter topology is a constant. The loop gain A1, therefore, is a constant and the straight line 30 in the FIG. 2 plot of loop gain versus AC line voltage is representative of the loop gain achieved by the circuit of FIG. 3 when a forward converter topology is used, as shown in the prior art.

In the flyback converter topology, energy is stored in the transformer core during the time that the primary winding is energized. When the primary switching transistor is turned off, the energy stored in the transformer core is transferred through the secondary winding of the filter and then to the load. The filter circuitry comprises a capacitor in addition to the inductance of the secondary winding of the transformer which, together, form an LC filter without the addition of a separate filter inductor as is the case with the forward converter topology. For this reason, the flyback converter topology is finding increased usage because of the economies of cost, volume, and weight that are achieved by elimination of the separate filter inductor.

Assume now that a flyback converter is installed as circuit 2 in the diagram of FIG. 3. The output voltage Vo for this converter is expressed as:

$$Vo = \frac{Vb}{n} \cdot \frac{Ton}{Toff} = \frac{Vb}{n} \cdot \frac{Ton}{T - Ton}$$

The loop gain A2 using the regulation circuitry of FIG. 3 with the flyback converter topology is given as:

$$A2 = \frac{dVo}{dVfb} = \frac{a}{\left(\frac{K\, K1\, D1\, T\, Vb}{C} - Vr(1 + Ao) + Vfb\, Ao\, G1\right)^2} \tag{4}$$

where:

a = arbitrary constant.

It will be noted that the equation (4) for A2 includes the variables Vb and Vfb in a term in the denominator thereof which is squared. Accordingly, the loop gain of the converter is variable with respect to line voltage and is shown as curve 32 in FIG. 2. This is highly inadequate regulation when compared to the regulation achieved with the forward converter topology.

Figure 1:
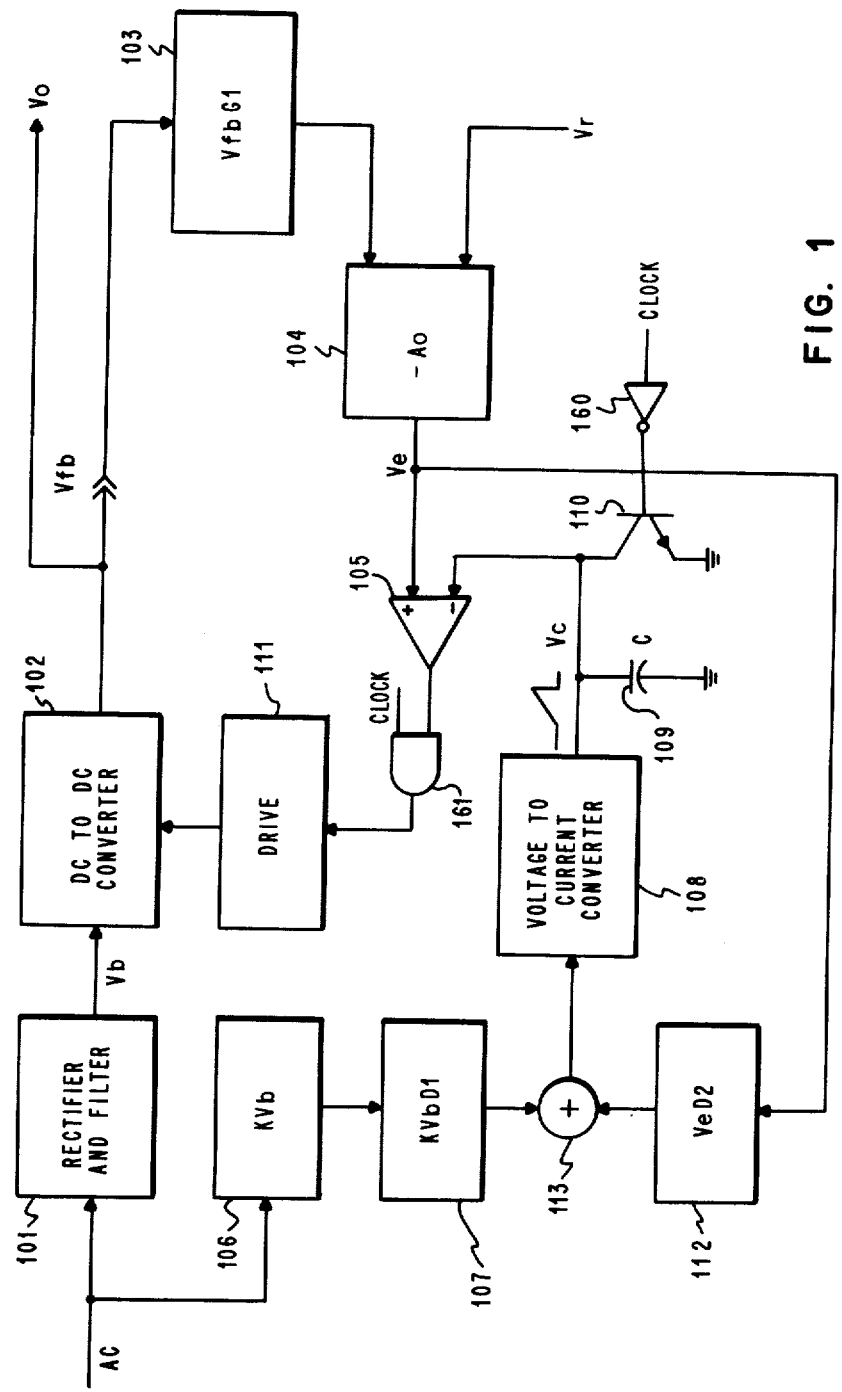
FIG. 1 is a block diagram of the circuit of this invention to provide a constant loop gain versus AC line voltage in a switching regulator power supply having a flyback topology.

In FIG. 1, the regulation circuitry of this invention is shown in a circuit usable with flyback converter topology to achieve a constant gain versus AC line voltage as expressed by the flat curve 30 in FIG. 2. The important difference in the circuit of FIG. 1 in comparison with the circuit of FIG. 3 is the summation of a portion of the Ve voltage with a portion of the KVb voltage to produce a KVbD1+VeD2 voltage that is applied to the voltage-to-current converter which, in conjunction with the capacitor generates the ramp of varying slope in accordance with both the magnitude of the AC input signal and the magnitude of the amplified error voltage. In FIG. 1, elements 100 through 111, 160 and 161 may be of the same type and configuration as those described for elements 1–11 and 60–61 in FIG. 3 with the exception that converter 102 has flyback topology rather than forward converter topology. Additionally, the fractional voltage multiplier circuit 112 to multiply the error voltage Ve by the constant D2 may comprise a resistive voltage divider, to provide a voltage which is summed with the KVbD1 voltage at node 113.

For the regulator circuit of FIG. 1 in which a flyback converter is used, the output voltage, Vo, is given as:

$$Vo = \frac{\frac{Vb}{n} \cdot Ve}{\frac{D1\,K\,K1\,T\,Vb}{C} + \frac{D2\,K1\,T\,Ve}{C} - Ve} \tag{5}$$

$$\text{If } D2 = \frac{C}{K1\,T} \tag{6}$$

then:

$$Vo = \frac{\frac{Vb}{n} \cdot Ve}{\frac{D1\,K\,K1\,T\,Vb}{C}} = \frac{Ve}{\frac{D1\,n\,K\,K1\,T}{C}} \tag{7}$$

The error voltage, Ve, may be expressed:

$$Ve = Vr - Ao\,(G1\,1\,Vfb - Vr) \\ = Vr\,(Ao + 1) - Ao\,G1\,Vfb \tag{8}$$

By substitution of the equation (8) expression of Ve into equation (7):

$$Vo = \frac{Vr(Ao + 1)}{\frac{D1\,n\,K\,K1\,T}{C}} - \frac{Ao\,G1\,Vfb}{\frac{D1\,n\,K\,K1\,T}{C}} \tag{9}$$

Accordingly, the loop gain $A3$ of the circuit of FIG. 1 is:

$$A3 = \frac{dVo}{dVfb} = -\frac{Ao\,G1}{\frac{D1\,n\,k\,k1\,T}{C}} \tag{10}$$

$$\text{where } D1 = \frac{Ve(\max)C\left(1 - \frac{Ton(\max)}{T}\right)}{K\,K1\,Vb(\min)\,Ton(\max)} \tag{11}$$

Note that the A3 gain in equation (10) is expressed entirely in terms of constants when D2 is sized according to the terms of equation (6). Accordingly, the straight line 30 of the graph of FIG. 2 accurately depicts the constant loop gain versus AC line voltage that is achieved by using the circuit of FIG. 1 with a flyback converter topology. For best design, D1 may be sized in accordance with the terms of equation (11).

Figure 4:
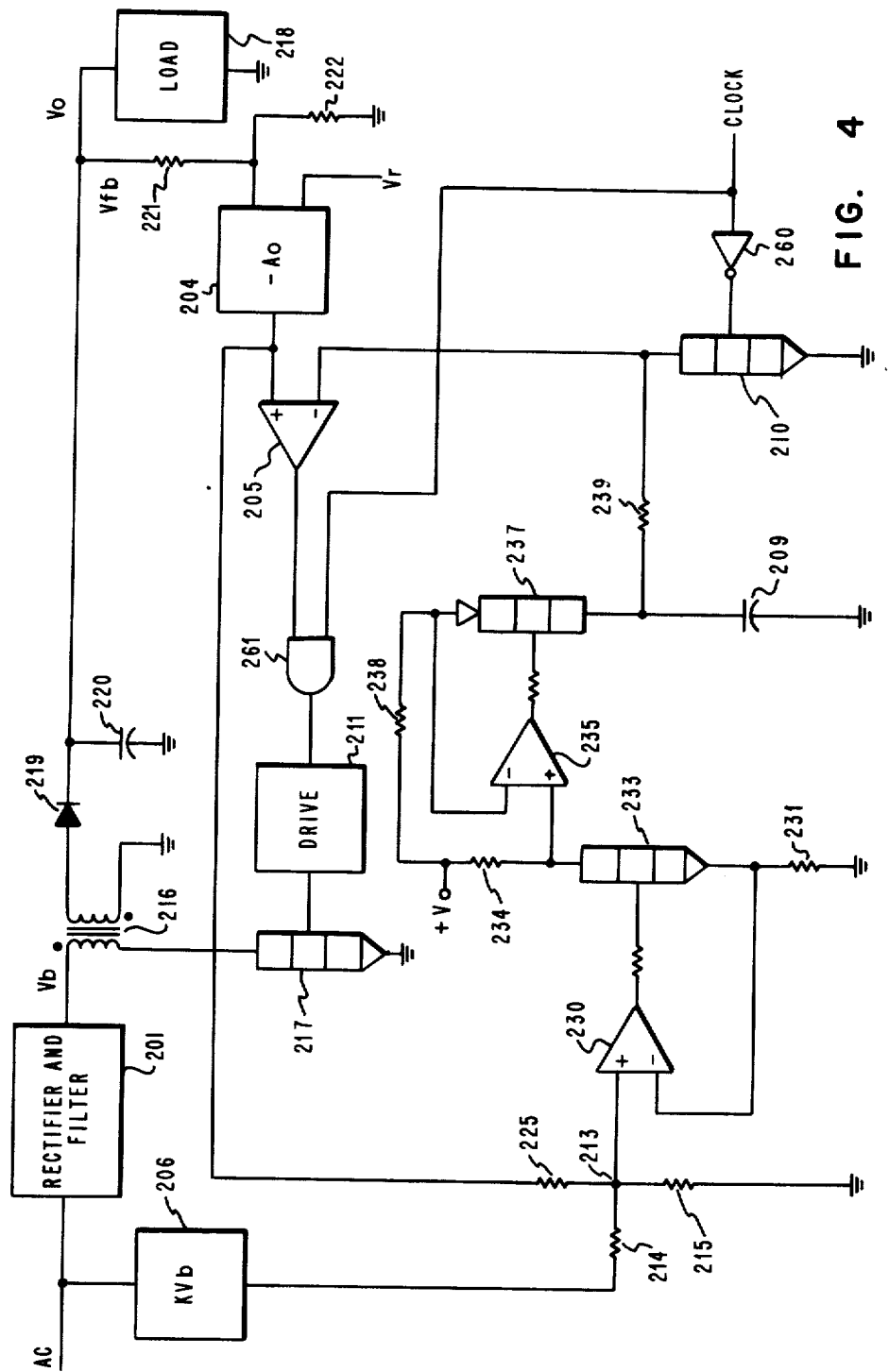
FIG. 4 is a circuit diagram of a flyback converter switching regulator power supply employing the regulation technique of this invention.

Referring now to FIG. 4, a more detailed circuit diagram of a flyback converter switching regulator power supply employing the regulation technique of this invention is shown. The rectifier and filter 201 may be of the type described for the rectifier and filter 1 in the description of the circuit for FIG. 3. The derivation of KVb by the circuit 206 may be the same as that employed in the transformer, rectifier, and filter circuit 6 in FIG. 3. The resistive divider resistors 214 and 215 provide the multiplication of the KVb voltage by the constant D1 as shown by circuit 107 in FIG. 1.

The Vb output voltage from the rectifier and filter circuit 201 is applied to one end of the primary winding of transformer 216. This winding is energized by periodically turning on transistor 217, which provides a connection of the other end of the primary winding of transformer 216 to ground. The secondary winding of the transformer is connected to a load 218 through a rectifier 219. A filter capacitor 220, in conjunction with the inductance of the secondary winding of transformer 216, provides an LC filter arrangement for the power supply output voltage Vo.

The resistive voltage divider comprising resistors 221 and 222 multiplies the Vfb feedback voltage by the fractional constant G1 for application to the positive terminal of the inverting error amplifier 204. The positive reference voltage Vr is applied to the negative terminal of amplifier 204. The Ve output signal from amplifier 204 is applied to the positive input of comparator 205. The Ve output voltage of amplifier 204 is also mutliplied by the constant, D2, by means of the voltage divider comprising resistors 225 and 215. Accordingly, the VeD2 voltage is summed with the KVbD1 voltage at node 213 and is applied to the positive input of operational amplifier 230. A current proportional to this input voltage flows through resistor 231 and resistor 234 and consequently through resistor 238, transistor 237 and into capacitor 209. Operational amplifier 235 produces a voltage follower action similar to amplifier 230.

The resultant ramp voltage of variable ramp angle, Vc, developed across capacitor 209 is applied to the minus input of the comparator 205. In the same manner as is described relative to comparator 5 in FIG. 3 and comparator 105 in FIG. 1, when the Ve voltage exceeds the Vc voltage during the ramp portion of the Vc voltage waveform, comparator 205 produces a positive output which is applied through the AND gate 261 to the drive circuitry 211 to cause transistor 217 to be turned on, thereby energizing the primary winding of transformer 216. When the Vc voltage exceeds the Ve voltage the output of the comparator 205 returns to its low state and transistor 217 is turned off by the drive circuitry 211. The inverter 260 and transistor 210 perform the same function as that described relative to inverter 60 and transistor 10 in FIG. 3. Resistor 239 provides a discharge time constant for capacitor 209 and controls the current through transistor 210.

As is the case with the circuit shown in FIG. 1, by using the sum of VeD2 voltage and the KVbD1 voltage input to the voltage-to-current converter for generation of the variable angle ramp voltage Vc, the loop gain of the flyback converter switching regulator power supply shown in FIG. 4 is made constant in accordance with the straight line 30, loop gain versus line voltage plot in FIG. 2.

The particular switching and primary winding arrangement in the primary of transformer 216 may take a variety of forms. A single switch arrangement may be used such as is shown in FIG. 4 or, alternatively, a half-bridge configuration may be used in which the transformer primary is interposed between two switching devices.

The KVb voltage may be derived from a number of places in the circuitry. As shown in FIGS. 1, 2 and 4, the KVb voltage is derived in a manner electrically isolated from the AC input signal by using a small transformer, rectifier and filter circuit, the turns ratio of the transformer defining the constant K. Alternatively, a voltage divider rather than a transformer may be used and this divider may be connected directly to the Vb signal output from the main rectifier and filter circuit. The KVb voltage could also be derived by adding another secondary winding to transformer 216 and a rectifier and filter to generate this voltage in a forward converter manner in phase with the energization of the primary winding of the transformer.

While the invention has been particularly shown and described with reference preferred embodiments thereof, it will be understood by those skilled in the art that the foregoing and other changes in form and details may be made therein without departing from the spirit and scope of the invention.

What is claimed is:

1. In a DC to DC converter having a flyback connected power transformer secondary winding, rectification, and filter circuit, and switching circuitry for selectively energizing the primary winding of said transformer, regulation circuitry comprising:
    means for amplifying the difference between a portion of an output voltage of said power supply and a reference voltage to generate an error voltage;
    means for generating a ramp voltage waveform having a ramp angle proportional to the sum voltage of a portion of said error voltage and a portion of a DC voltage applied to said converter;
    means for inhibiting said means for generating said ramp voltage waveform regardless of ramp voltage magnitude and for maintaining said ramp voltage generating means in an inhibited state for a predetermined time duration;
    means for comparing said error voltage with said ramp voltage waveform; and
    means, during the rising period of said ramp voltage, for applying a signal to said switching circuitry to energize said primary winding while said error voltage exceeds said ramp voltage.

2. The DC to DC converter of claim 1 wherein said means for amplifying the difference between a portion of said output voltage and said reference voltage further comprises a resistive voltage divider connected to said output voltage and an inverting amplifier having an input receiving a signal from an output of said voltage divider.

3. The DC to DC converter of claim 2 wherein said means for generating said ramp voltage waveform further comprises a current generator having an output connected across a capacitor for generation of said ramp voltage.

4. The DC to DC converter of claim 3 wherein said current generator further comprises a voltage-to-current converter.

5. The DC to DC converter of claim 4 wherein said voltage-to-current converter includes an input connected to a node at which said portion of said error voltage and said portion of said DC voltage applied to said DC to DC converter are summed, whereby the current output of said voltage-to-current converter varies in accordance with said sum voltage to provide said ramp voltage across said capacitor having an angle proportional to said sum voltage.

6. The DC to DC converter of claim 5 wherein said means for inhibiting further comprises switching means connected across said capacitor for selectively discharging said capacitor and preventing said capacitor from being charged while said switching means is conductive.

7. The DC to DC converter of claim 6 wherein said switching means is connected across said capacitor through a resistor.

8. The DC to DC converter of claim 6 further comprising gating means interposed between said means for comparing and said means for applying a signal to said switching circuitry for enabling the application of said signal to said switching circuitry at only those times during which said switching means connected across said capacitor is open.

9. The DC to DC converter of claim 8 wherein said switching means connected across said capacitor is open in phase with an up level of a clock pulse train.

10. The DC to DC converter of claim 9 wherein said switching circuitry for selectively energizing said primary winding comprises a pair of transistors connected at opposite ends of said primary winding in a half-bridge configuration.

11. The DC to DC converter of claim 9 wherein said switching circuitry for selectively energizing said primary winding comprises a single switching device connected between one end of said primary winding and ground.

12. The DC to DC converter of claim 9 wherein said DC voltage applied to said DC to DC converter is derived from rectification of a line voltage AC signal and wherein said portion of said DC voltage is derived from a voltage divider connected between said DC voltage and ground.

13. The DC to DC converter of claim 9 wherein said DC voltage applied to said DC to DC converter is derived from rectification of a line voltage AC signal and wherein said portion of said DC voltage is derived from the rectified output of a second transformer, said second transformer having a primary to which said line voltage AC signal is applied.

14. The DC to DC converter of claim 9 wherein said DC voltage applied to said DC to DC converter is derived from rectification of a line voltage AC signal and wherein said portion of said DC voltage is derived from the rectified output of a second secondary winding of said power transformer, said second secondary winding and a second rectifier being connected in a forward converter mode.

15. In a DC to DC converter in which a feedback signal derived from the converter output is compared to a reference voltage for generation of an error voltage which error voltage is compared to the instantaneous amplitude of a ramp voltage for control of the "on" times of converter switching devices, wherein a feed forward signal proportional to line voltage is applied to a ramp generator to control the slope of said ramp voltage, the improvement comprising:
    means for multiplying said error voltage by a constant to generate a first signal;
    summing means receiving said feed forward signal as an input and having an output applied to said ramp generation circuit to affect the slope of said ramp;
    said summing means receiving said first signal as a second input thereto for addition of said first signal to said feed forward signal; and
    said ramp generation circuit including means for inhibiting the generation of said ramp voltage regardless of ramp voltage magnitude and for maintaining said ramp voltage generation circuit in an inhibited state for a predetermined time duration.

* * * * *